United States Patent

Faccou

[15] 3,679,235
[45] July 25, 1972

[54] PIPE SWIVEL JOINT FOR CORROSIVE FLUIDS

[72] Inventor: Armand L. Faccou, Santa Ana, Calif.
[73] Assignee: FMC Corporation, San Jose, Calif.
[22] Filed: Aug. 24, 1970
[21] Appl. No.: 66,323

[52] U.S. Cl.................................285/14, 285/47, 285/276, 285/281, 285/348
[51] Int. Cl......................................F16l 55/00
[58] Field of Search.................285/276, 277, 348, 281, 47, 285/39, 90, 404, 13, 14, 357, 355; 151/7; 138/96 T; 16/2

[56] References Cited

UNITED STATES PATENTS

| | | |
|---|---|---|
| 3,420,555 | 1/1969 | Fallou....................................285/276 |
| 1,575,259 | 3/1926 | Fisher...............................285/348 X |
| 1,650,788 | 11/1927 | Doughs..............................285/281 X |
| 1,592,224 | 7/1926 | Pieper...............................285/357 X |
| 2,705,158 | 3/1955 | Risley.....................................285/47 |

FOREIGN PATENTS OR APPLICATIONS 1,291,666  3/1962  France.................................285/348

Primary Examiner—Dave W. Arola
Attorney—F. W. Anderson, C. E. Tripp and W. W. Ritt, Jr.

[57] ABSTRACT

A pipe swivel joint designed especially for handling very corrosive fluids, with an annular externally-adjustable pressure plate that bears against the joint's packing, and a series of energizing screws to force the plate to compress the packing into a fluid-tight seal between the joint's outer and inner relatively rotatable elements. The screws extend through the radial wall of the joint's outer element rather than longitudinally through the inner element, thereby facilitating a reduction in the outside diameter of the inner element to provide a more compact joint of less overall radial dimension. The screws are threaded through corrosion-resistant sleeves so that they will not seize to the joint's outer element if corrosion should occur, and the sleeves are threaded into the outer element so that they can be easily replaced if necessary.

12 Claims, 4 Drawing Figures

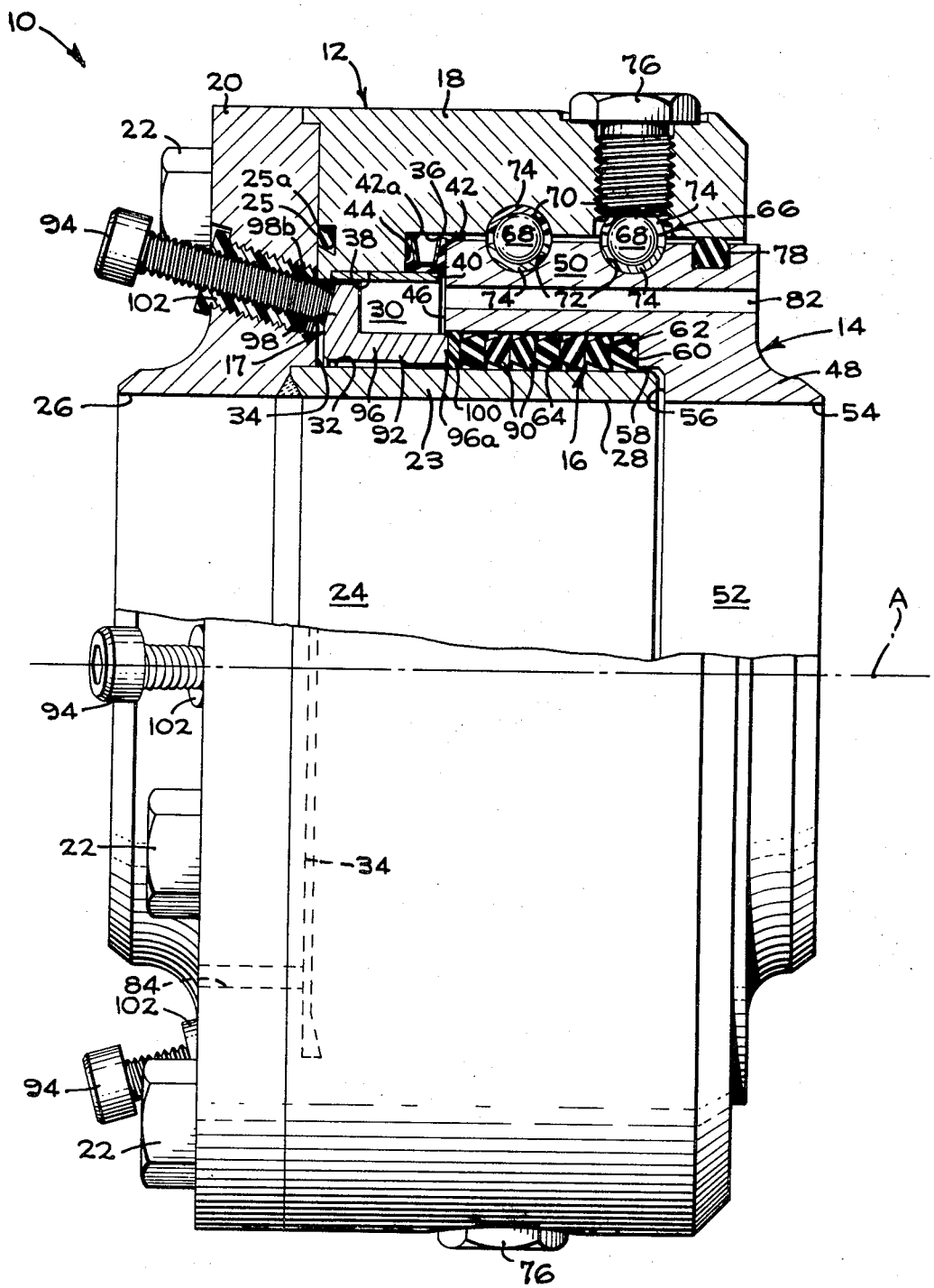
FIG_1
INVENTOR
ARMAND L. FACCOU

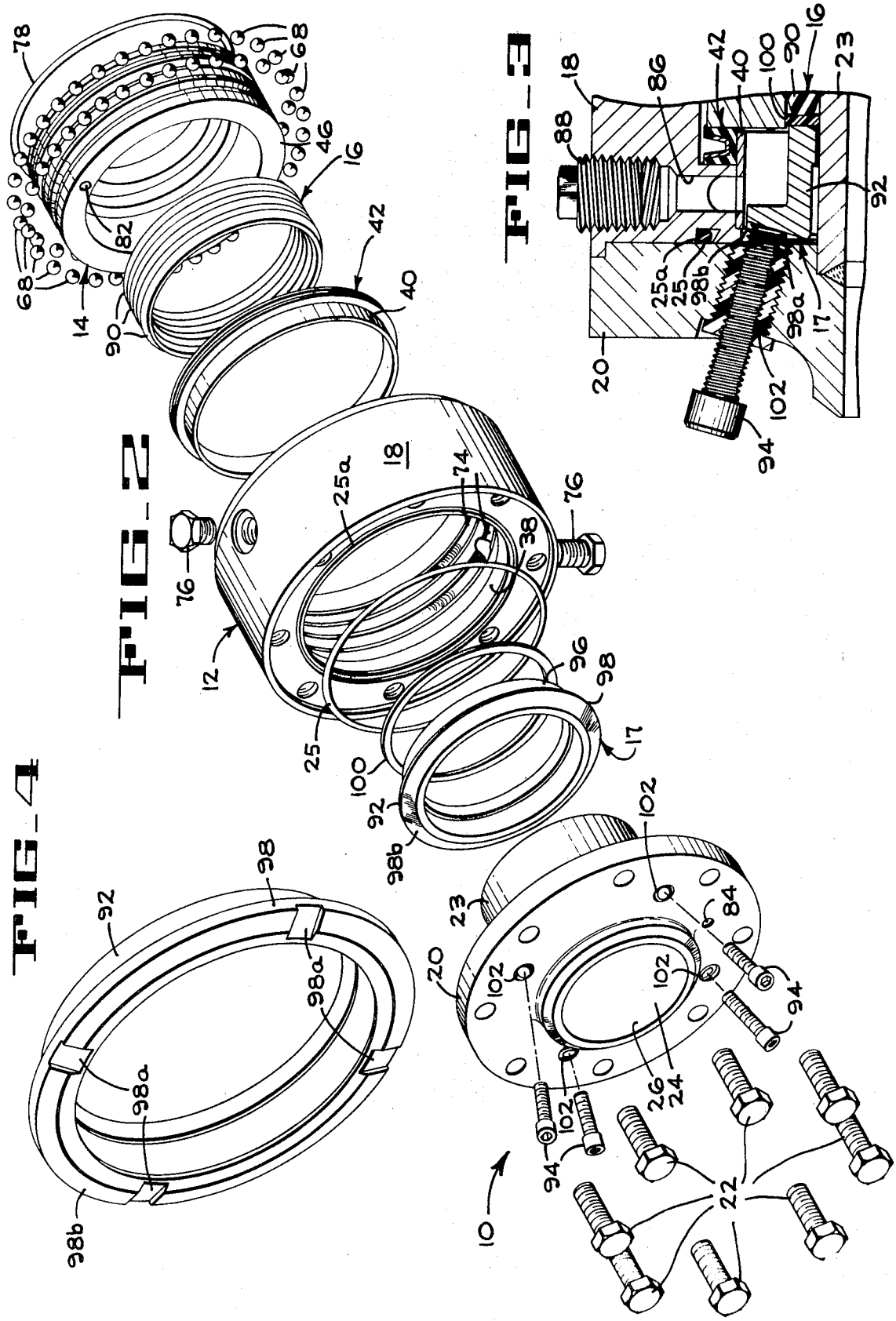

PIPE SWIVEL JOINT FOR CORROSIVE FLUIDS

BACKGROUND OF THE INVENTION

This invention relates to swivel joints for fluid carrying pipes, and particularly to a swivel joint for use in very corrosive service. More specifically, the invention involves a pipe swivel joint with a packing that is externally adjustable by means of a series of screws that are strategically positioned so that the overall diameter of the joint can be significantly reduced into a more compact size.

Swivel joints in conduits used for transporting corrosive fluids and those at elevated temperatures, such as sulfuric acid, hydrogen sulfide, steam, etc., are subjected to conditions so severe that frequently leakage occurs at the packing in a relatively short time. The packing in these joints also undergoes abrasive wear as the joint swivels, wear which is accelerated by heat and chemical reaction. In many cases the packing may be only slightly worn so that simple adjustment or tightening thereof would suffice to reestablish the fluid-tight integrity of the joint. In other cases the packing has become so totally worn that replacement is required. Leaks in systems under these conditions demand prompt repair, but taking the joint apart to replace the leaky packing, though always a costly procedure, is not always possible.

Several inventions have been directed to swivel joints with packings that are adjustable without having to completely disassemble the joint, but all of these possess inherent deficiencies. One such invention, described in Snyder et al. U.S. Pat. No. 2,927,804, involves a swivel joint having an externally threaded, annular pressure plate for adjustment of its packing. While the packing of this device is adjustable without complete disassembly of the joint, replacement of the packing requires the removal of a major portion of the joint, and this is time consuming as well as difficult. Further disadvantages encountered with this type of joint are that the packing is spaced axially from the bearing system and thus is more vulnerable to wear, and when the packing becomes worn and begins to leak, the escaping fluids can corrode the pressure plate and the thread system for adjusting it.

In my U.S. Pat. No. 3,420,555 a substantially improved type of adjustable swivel joint is described, this joint incorporating a bolt adjusted pressure plate with the adjustment bolts extending longitudinally through the inner or male conduit. That design has been found to be very satisfactory in most environments, but when used with very corrosive materials, such as sulphuric acid, the bolts tend to seize up to the male conduit if any corrosive material escapes past the packing. Other problems with this design are that complete disassembly of the joint is required to replace the packing, and the male conduit has to be constructed thicker and heavier than desirable in order to accommodate the bolts for adjusting the packing, this latter problem being especially significant where several joints must be very closely spaced in tight quarters.

SUMMARY OF THE INVENTION

The present invention comprises a pipe swivel joint especially adapted for handling acids and other highly corrosive liquids and gases, the joint including an externally adjustable, annular packing disposed radially inwardly of a swivel bearing between inner and outer concentric, relatively rotatable members. The packing adjustment device comprises an annular pressure plate that bears against the packing, and a plurality of externally accessible energizing screws in contact with the plate and arranged so that when they are threaded inwardly, the packing is compressed between the relatively rotatable joint elements to provide a fluid-tight seal therebetween. The actuating screws are threaded into sleeves of corrosion resistant material that, in turn, are threaded into ports through the rear of a removable radial flange-like portion of the outer or female member of the joint. These screws are positioned so that they do not extend between the joint's bearing and packing systems, and thus this joint is markedly more compact in size than those of the prior art. The corrosion resistant sleeves prevent the energizing screws from seizing up, and makes them easily and quickly replaceable without need for disassembly of the joint. The radial flange-like portion of the joint's outer or female member is secured thereto by externally accessible bolts, and its removal provides access to the joint's packing chamber for servicing or replacing the packing material without otherwise dismantling the joint.

Accordingly, one object of the present invention is to provide a pipe swivel joint with improved, more compact packing adjustment features.

Another object of the invention is to provide a pipe swivel joint that is especially useful for corrosive fluid transport and a packing that may be compressed or adjusted while the joint is in service, so that leakage may be stopped without taking the joint apart.

Still another object of the present invention is to provide a pipe swivel joint with an externally accessible packing adjustment system that is protected from seizing up or otherwise becoming inoperable should the packing leak corrosive materials.

The foregoing and other objects of the invention will become readily apparent from the following description thereof including the accompanying drawings.

BRIEF DESCRIPTION OF THE DRAWINGS

FIG. 1 is a view in elevation, with a portion in axial section, of a swivel joint according to this invention.

FIG. 2 is an exploded perspective view, in reduced scale, of the swivel joint illustrated in FIG. 1.

FIG. 3 is a view in axial section of a portion of a modified version of the swivel joint of FIGS. 1 and 2.

FIG. 4 is a view in perspective of the pressure plate in the swivel joint of FIG. 3.

DESCRIPTION OF THE PREFERRED EMBODIMENT

As illustrated in FIGS. 1 and 2, the preferred embodiment of a swivel joint according to the present invention is generally designated by the numeral 10. This joint includes an outer conduit or female member 12, an inner conduit or male member 14 swivelly connected to the outer member 12, an annular packing 16 that forms a fluid-tight seal between the two conduits 12 and 14, and an adjustable packing pressurizing assembly 17 for externally adjusting the packing 16.

With reference to FIG. 1, outer member 12 consists of an annular main body element 18, an annular radial flange 20 bolted to the rear end of the element 18 by spaced flange bolts 22, and an annular sleeve 23 welded or otherwise fixed to the annular flange 20. Alternatively, the flange 20 and the sleeve 23 can be formed as a single, integral part. An O-ring 25, installed in a groove 25a in the element 18, seals against leakage of corrosive material between the element 18 and the flange 20 and protects the flange bolts 22 against the corrosive material.

The outer member 12 has an unobstructed axial bore 24, with an axis A, formed by an inner cylindrical wall 26 of the flange 20 and an inner cylindrical wall 28 of the sleeve 23, the bore 24 providing a fluid flow passage through this outer member 12. Between the sleeve 23 and the element 18 is an annulus 30 defined by the sleeve's outer cylindrical wall 32, the inner radial wall 34 of the flange 20, and a first inner cylindrical wall 36 of the element 18. The wall 36 is relieved at 38 to accommodate a sleeve 40 of stainless steel, fluoroethylene polymer, or other corrosion-resistant material, the sleeve functioning as a backup or retainer for an annular bearing seal 42 between the radial wall 44 of the element 18 and the confronting radial rear end wall 46 of the inner member 14.

With further reference to FIG. 1, the inner member 14 comprises an external annular body portion 48 for securing the member to the end of a pipe (not shown), and an internal annular portion 50 extending rearwardly from the portion 48. The inner member 14 has a bore 52 with a cylindrical wall 54, this bore being coaxial with the bore 24 of the outer member 12 when the swivel joint is assembled as shown in FIG. 1. The member 14 also has a first counterbore with a radial wall 56 and an axial cylindrical wall 58 to provide an annular space for receiving the end of the sleeve 23. A second, larger diameter counterbore, defined by an annular radial wall 60 and an axial cylindrical wall 62, functions in cooperation with the sleeve 23 to provide a packing chamber 64 between the outer and inner members 12, 14.

The members 12, 14 are interconnected in the usual manner for relative swivel movement by a double-row bearing system 66, the system including balls or other rollable elements 68 in races 70 and 72 of the members 12, 14, respectively, stainless steel or other corrosion-resistant snap-ring type bearing race inserts 74, and access plugs 76. An outer bearing seal 78 retains lubricant in the bearing system and isolates the system from the external atmosphere, protecting it from dust, moisture and other outside contamination. The inner bearing seal 42 prevents corrosive material that might have leaked by the packing 16 from reaching the bearing system, and is positioned with its energizer spring 42a facing away from the annulus 30 to insure against it contacting such material. As previously mentioned, the seal 42 is retained in proper position by the corrosion-resistant cylindrical sleeve 40, which sleeve can be either unbroken or split by a small gap, since it serves only as a backup and retainer for the seal rather than a fluid barrier.

A series of circumferentially spaced vent passages 82 through the inner member 14 allow fluid which has leaked past the annular packing 16 to escape to the atmosphere, and a second series of similarly spaced vent passages 84 in the flange 20 are also provided for drainage of the joint. If desired, one or more wash ports 86 (FIG. 3) extending through the element 18, and with sealing plugs 88, can be substituted for the passages 82, 84, and these ports can be connected to a fresh water system so the joint can be flushed out. Water drained from the joint can be checked with litmus paper to determine whether all the corrosive material has been removed. This flushing method would be especially valuable when this joint is used in marine-type loading arms, as it usually is quite a costly and time consuming job to remove the joints in these arms for cleaning.

As mentioned above, the annular packing 16, which seals the interstices between the outer and inner members 12, 14 against fluid leakage, is contained in the annular packing chamber 64 defined by axial walls 32, 62 and radial wall 60. Depending on the service in which the swivel joint of this invention is to be employed, many combinations of materials are suitable for packings, including asbestos, various elastomers, plastics and metals. Packings made from virgin fluoroethylene polymers, asbestos impregnated with such polymers, and combinations of such polymers with rubber and metallic foil will perform satisfactorily in this joint. Since fluoroethylene polymers alone or in combination with other chemically inert materials, have been found highly durable in sealing applications involving highly corrosive chemicals, such materials are particularly useful with the present invention.

As illustrated in FIGS. 1 and 2, the packing 16 employed in this embodiment comprises a plurality of hard rubber rings 90 of trapezoidal configuration in cross section. It should be understood, however, that packing rings of other cross-sectional configurations may be employed successfully in the swivel joint herein described. Thus, rings of rectangular, triangular, or chevron cross-section, or combinations thereof, may be used.

Referring again to FIG. 1, the assembly 17 for externally adjusting the packing includes an annular pressure plate 92, having an L-shaped cross-section, and a series of spaced packing energizing or adjustment screws 94 extending through the flange 20 for applying force to the pressure plate 92. Pressure plate 92 is comprised of a tubular portion 96, and a radial flange portion 98 projecting outwardly from the tubular portion's rear end section. The pressure plate 92 can be constructed from carbon steel and then coated with a corrosion-resistant material to protect it from the deleterious effects of leaked fluid, or it can be formed entirely from stainless steel or other corrosion-resistant material of sufficient strength and rigidity.

The front end 96a of the pressure plate's tubular portion 96 extends into the packing chamber 64 and bears against an annular fluoroethylene polymer washer 100 that abuts the packing 16. This washer presents a surface having a low coefficient of friction, thus facilitating relative rotation between the pressure plate 92 and the packing 16 instead of between the plate and the outer member 12. If desired, notches 98a (FIGS. 3 and 4) can be milled or otherwise provided in the flange portion 98 to accept the screws 94 and thereby lock the plate 92 to the member 12.

The rear surface of the pressure plate's flange portion 98 is beveled at 98b so that the screws 94 will bear against it in a perpendicular attitude, thus providing optimum pressure application. The screws are disposed in the flange 20 at an angle to the joint's axis A to provide adequate clearance for using a wrench or other tool to adjust them, especially when the joint is in close proximity to an elbow in the pipe line.

The energizing screws 94 are threaded into and through rigid sleeves 102 constructed of a fluoroethylene polymer, stainless steel, Monel metal, ceramic, or other suitable corrosion-resistant material, so that if the packing 16 should leak and corrosion of the screws occur they can still be easily replaced since they will not "seize" to the sleeves. As illustrated in FIGS. 1 and 3, the sleeves 102 are threaded into the flange 20, facilitating their easy removal and replacement if that becomes necessary, such as if their threads become stripped. Thus regardless of the state of the packing 16, i.e., whether it is intact and providing a fluid-tight seal so that the atmosphere in the annulus 30 is non-corrosive, or whether it is leaking and hence the annulus atmosphere is very corrosive, the energizing screws 94 remain freely rotatable with respect to the outer member 12. The outstanding advantages of this feature are readily apparent when compared with the numerous problems involved when a swivel joint is leaking corrosive material and the leak cannot be stopped short of replacing the packing or the entire joint.

As shown in my previous U.S. Pat. No. 3,420,555, which is also directed to a swivel joint with an adjustable packing, the packing 16 is positioned directly beneath the bearing system 66, that is, on a perpendicular drawn from the common axis A to the bearing system. Placement of the packing 16 in this orientation serves to minimize any adverse loadings on the packing due to angular forces tending to deflect the axis of one of the members 12, 14 out of alignment with the other member, and also to eliminate stress on the bearings due to forces created during packing. In this latter regard, the forces of packing adjustment are transmitted instead to the walls 32, 60, and 62 of the packing chamber 64.

The swivel joint 10 can be quite easily assembled in the following manner. The inner bearing seal 42 and its retaining sleeve 40 are positioned in the outer member 12, and the inner member 14 with the outer bearing seal 78 in place is interfitted into the outer member 12. The balls 68 are installed in their races 70, 72 to hold the conduits 12, 14 together, and the plugs 76 are inserted to seal in the balls. Lubricant is applied to the bearings before assembly. The pressure plate 92 is slipped over the sleeve 23 on the flange 20, followed by the washer 100 and the packing 16. After installing the O-ring 25 in its groove, the sleeve 23 is inserted into the inner member 14 and the flange 20 is bolted to the element 18 by means of the bolts 22. The sleeves 102 are threaded into the flange 20, and the packing energizing screws 94 are threaded into the sleeves. The screws 94 are turned inwardly into contact with the pressure plate 92 to compress the annular packing 16 axially against the radial wall 60, and expand it radially to form a fluid-tight seal of the interstices between the inner and outer members 14, 12. This procedure can be reversed to disassemble the joint.

From the foregoing description, it should be apparent that the swivel joint of the present invention has a number of advantages. This joint can be used with great advantage in systems transporting highly corrosive materials since the packing is readily adjustable to maintain a fluid-tight seal, the joint can be easily flushed to remove corrosive material, and the actuating screws can be easily removed and replaced if they should corrode. Further, the packing can be replaced without complete disassembly of the joint, for ready accessibility to the packing chamber 64 is provided by the removable flange 20.

Although the best mode contemplated for carrying out the present invention has been herein shown and described, it will be apparent that modification and variation may be made without departing from what is regarded to be the subject matter of the invention.

What is claimed is:

1. A pipe swivel joint comprising, in combination: an outer conduit including a tubular portion, a flange portion fastened to the tubular portion, and a sleeve circumscribed by said tubular portion and joined to the flange portion, said tubular portion and said sleeve defining an annulus; an inner conduit including a tubular portion projecting into the annulus, the inner conduit being swivelly coupled to the outer conduit, said outer and inner conduits presenting a coaxial bore therethrough; an annular packing chamber between the tubular portion of the inner conduit and the sleeve; an annular packing disposed in the packing chamber; an annular packing adjustment element in the annulus, said element having a first portion extending axially into the packing chamber and a second portion extending radially from the first portion; and a series of energizing screws, extending through corrosion-resistant sleeves which are threaded into the flange portion of the outer conduit, for adjustment of the packing, said screws being threaded inwardly of the swivel joint against the adjustment element to force its first portion against the packing to compress the packing into a fluid-tight seal between said outer and inner conduits.

2. A pipe swivel joint for transport of highly corrosive materials comprising, in combination: a first conduit including a radial flange portion, a tubular portion removably secured to said flange portion, and a sleeve circumscribed by said tubular portion and having an end secured to said flange portion; a second conduit swivelly interconnected to the first conduit and having a tubular portion disposed between the sleeve and the first conduit's tubular portion, said second conduit and said sleeve defining an annular packing chamber; an annular packing disposed in the packing chamber to provide a fluid-tight seal between the first and second conduits; an annular pressure plate for transmitting compressive force to the packing, said pressure plate including a tubular portion extending into the packing chamber and against said packing; a plurality of corrosion-resistant sleeves removably mounted in circumferentially-spaced ports through the first conduit's flange portion; and a plurality of corrosion-resistant energizing screws extending through the sleeves into engagement with the pressure plate, whereby when said screws are turned inwardly of the flange portion said pressure plate is forced against the packing to energize it into a fluid-tight seal between the conduits.

3. A pipe swivel joint according to claim 2 wherein the sleeves are threaded into the ports.

4. A pipe swivel joint according to claim 2 wherein the sleeves extend through the flange portion at an acute angle with respect to an axis through the swivel joint.

5. A pipe swivel joint according to claim 2 wherein the swivel connection between the first and second conduits comprises a rollable bearing system, and wherein said bearing system is positioned on a perpendicular from the swivel joint's axis through the packing.

6. A pipe swivel joint according to claim 2 wherein the pressure plate includes means to cooperate with the energizing screws to prevent rotation of said pressure plate with respect to said screws about the axis of the swivel joint.

7. A pipe swivel joint according to claim 2 including a drain passage to facilitate escape to the outside of the swivel joint of fluid that has leaked past the packing.

8. A pipe swivel joint according to claim 2 including a wash port system for flushing out fluid that has leaked past the packing.

9. A pipe swivel joint comprising, in combination: a first annular member including a radial flange portion, an outer tubular portion, and an inner tubular portion; a second annular member including a tubular portion swivelly coupled to the outer tubular portion of the first annular member, said first and second annular members having a coaxial bore therethrough and defining an annular packing chamber disposed between the inner tubular portion of the first annular member and the tubular portion of the second annular member; an annular packing disposed in the packing chamber to provide a fluid seal between the first and second annular members; an annular force element disposed in contact with the packing; and a series of energizing screws threaded into corrosion-resistant sleeves which are in turn threaded into the flange portion of the first annular member, said screws being threaded inwardly of the swivel joint to urge the force element tightly against the packing.

10. A pipe swivel joint for transport of highly corrosive fluids comprising, in combination: a first conduit having a cylindrical tubular portion and an annular flange portion with an attached cylindrical tubular sleeve projecting into the tubular portion, said tubular portion and said sleeve defining an annulus therebetween; a second conduit, having a cylindrical tubular portion and an annular portion, swivelly coupled to the first conduit, the tubular portion of the second conduit projecting into the annulus; an annular packing chamber defined by the tubular portion of the second conduit and the sleeve; an annular packing element disposed in the packing chamber; and means in the first conduit for externally applying force to compress the packing element into a fluid-tight seal between the first and second conduits, said force applying means comprising an annular pressure plate having one end that bears against the packing element, and externally adjustable threaded elements extending through the first conduit's annular flange portion into contact with the other end of the pressure plate, said threaded elements received in corrosion-resistant sleeves that extend through and are threaded into said flange portion, whereby when said threaded elements are turned inwardly they apply a compressive force through the pressure plate to the packing element.

11. A pipe swivel joint according to claim 10 wherein the threaded elements are screws having wrench portions located outside the joint.

12. A pipe swivel joint according to claim 10 wherein the pressure plate is coated with a corrosion resistant material, wash ports are incorporated into the first conduit for cleaning corrosive materials from the joint, and the pressure plate includes recessed areas to receive the threaded elements to preclude rotation of said pressure plate with respect to the flange portion.

* * * * *